United States Patent [19]

Walsh

[11] Patent Number: 4,518,114
[45] Date of Patent: May 21, 1985

[54] DIP SOLDERING APPARATUS AND METHOD

[75] Inventor: Thomas A. Walsh, Asbury, N.J.

[73] Assignee: Hewlett-Packard Company, Palo Alto, Calif.

[21] Appl. No.: 520,961

[22] Filed: Aug. 8, 1983

[51] Int. Cl.³ ............................ B23K 3/00; B23K 1/08; H01R 43/02

[52] U.S. Cl. ............................. 228/180.1; 228/36; 228/37; 228/214

[58] Field of Search ............... 228/180 R, 214, 36, 228/37

[56] References Cited

U.S. PATENT DOCUMENTS

| | | | |
|---|---|---|---|
| 2,619,063 | 11/1952 | Anderson | 228/37 X |
| 3,765,591 | 10/1973 | Cook | 228/180 R X |
| 4,047,655 | 9/1977 | McCafferty | 228/36 X |
| 4,113,165 | 9/1978 | Ott | 228/36 |

Primary Examiner—Kenneth J. Ramsey
Attorney, Agent, or Firm—Donald N. Timbie

[57] ABSTRACT

Method and apparatus for forming an electrical contact between mounting pins extending from an electrical component and insulated wires from the component that are wrapped around the pins in which the tips of the pins are held in a flowing pool of molten solder until the heat travelling up the pins loosens the insulation up to a desired level, and the pins are then quickly immersed up to that level and then quickly removed so as to cause the solder to melt and carry away the loosened insulation but to leave substantially intact the insulation that is not loosened.

2 Claims, 5 Drawing Figures

DIP SOLDERING APPARATUS AND METHOD

BACKGROUND OF THE INVENTION

Many electrical components such as transformers are mounted inside a shell having parallel metal pins extending therefrom that are to be inserted in a printed circuit board, and insulated wires from various points of the component are wrapped around selected pins. Electrical contact between the wires and the mounting pins around which they are wrapped is achieved by applying flux to the pins and dipping them into a pool of solder. The insulation is made of polyurethane or some other material that disintegrates at the temperatures involved so as to permit the solder to make good electrical contact between the wires and their mounting pins. A major disadvantage of this process is that insulation just above the highest point reached by the solder is disintegrated by the heat carried by the mounting pins and the wires when they are left in the solder long enough to form a good electrical connection. This exposes insulated surfaces of the mounting pins and wires to the corrosive effects of the atmosphere that, in time, can make the component defective. A further disadvantage of this process is that small wires are often dissolved so that no electrical connection is made.

BRIEF SUMMARY OF THE INVENTION

When the electrical connections between the wires and mounting pins are made in accordance with this invention, the insulation on the wires meets the solder covering them at a given line of demarcation so that no bare wires or pins are exposed to corrosive action, and the life and reliability of the electrical component are thereby greatly increased. After coating the mounting pins and wires with solder flux, as in the prior art, the tips of the mounting pins are immersed into a pool of moving solder up to a first dipping level for a first timed period that is just long enough for the heat that travels up the mounting pins and wires to loosen the insulation up to the desired line of demarcation and to preheat the mounting pins and wires to a temperature that will permit the formation of a good electrical connection. The mounting pins and wires are then immersed farther into the solder up to a second dipping level at the junction of the loosened insulation and the unloosened insulation for a second timed period that is too short for more insulation farther up the wires to be loosened or for a good solder connection to be made between cold pins and wires but long enough for the loosened insulation to be carried away and good solder connections to be made between the preheated mounting pins and wires.

Some other advantages of the invention are set forth below:

1. With other methods, a component is held at the solder wetting depth and therefore close to the hot solder for the entire dipping cycle, while with the method of this invention, it is close to the hot solder for a portion of the very short second timed period.

2. Burned plastic is practically eliminated by precisely controlling the periods of immersion.

3. Residual melted insulation around the terminal pins is greatly reduced because immersion at the first dip level softens the insulation and the moving solder bath carries it quickly away.

4. Variations in degree and texture of solder wetting is eliminated by precise control of the temperature of the solder and times of immersion.

5. Wire breakage entrapment by subsequent solidifying of melted plastic at terminals is eliminated because time, temperature and depth of immersion are controlled to minimize the melting of the shell.

6. Dissolution and embrittlement of fine wire is eliminated by precise control of the duration of the periods of immersion and the temperature of the solder.

7. Operator fatigue is greatly reduced by eliminating the need to repeatedly extend his arms over a hot solder pot.

DETAILED DESCRIPTION OF THE INVENTION

Figure 1:
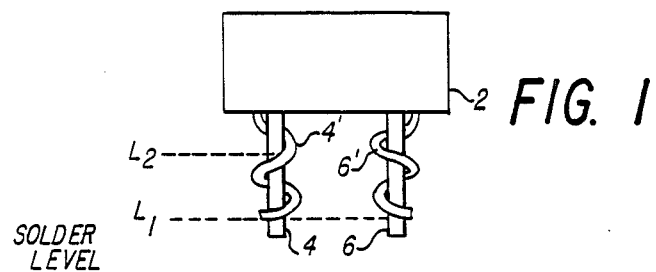
FIG. 1 illustrates a part having pins extending therefrom around which insulated wires are wound.

A typical electrical component to which this invention is applicable is illustrated in FIG. 1. It is comprised of a shell 2 with parallel mounting pins 4 and 6 extending therefrom that have insulated wires 4' and 6' wound around them. During the first timed period, the mounting pins 4 and 6 are immersed in the solder up to a first dip level $L_1$ so that only the tips of the mounting pins are in the solder. The insulation is loosened up to a desired line of demarcation at a second dip level $L_2$ and the mounting pins and wires up to this level are brought to a temperature at which a good solder connection can be formed. During the second timed period, the mounting pins 4 and 6 are immersed in the solder up to the level $L_2$ and then removed from the solder. The second timed period can be much shorter than the first and still permit a good solder connection to be made because of the preheating of the mounting pins 4, 6 and the wires 4', 6', and the solder and insulation meet at the level $L_2$.

Figure 2:
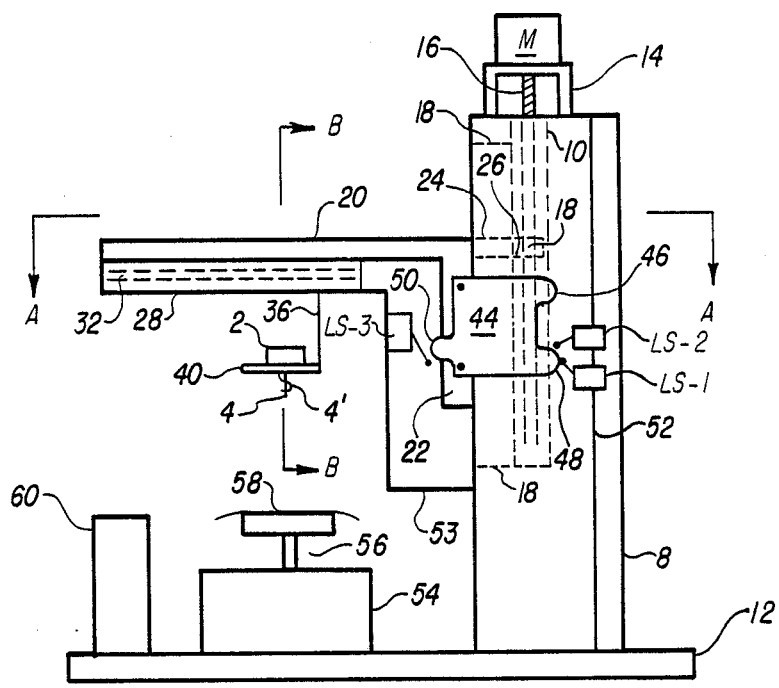
FIG. 2 illustrates one form of mechanical apparatus that can be made to operate in accordance with the invention.
Figure 2A:
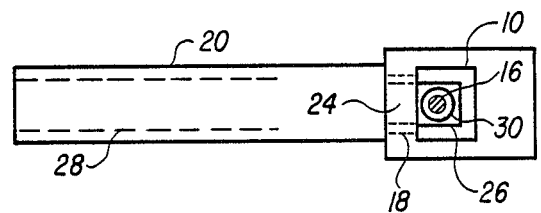
FIG. 2A is a section AA of FIG. 2.
Figure 2B:
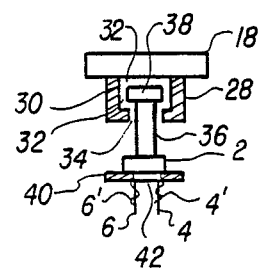
FIG. 2B is a section BB of FIG. 2.

FIG. 2 and FIGS. 2A and 2B, which are respectively sections AA and BB of FIG. 2, illustrate apparatus for carrying out the dip soldering process of this invention. A pedestal 8 having a vertical cavity 10 of rectangular cross-section in the upper portion thereof is mounted on a base 12, and a motor M is mounted by a bracket 14 on top of the pedestal 8 in such manner that it rotates a threaded shaft 16 in the center of the cavity 10. A vertical slot 18 is formed in the left side of the pedestal 8 that communicates with the cavity 10. An L-shaped bracket comprised of a horizontal arm 20 and a vertical arm 22 that are wider than the slot 18 is mounted with the vertical arm 22 against the left side of the pedestal 8, and a member 24 attached to the arm 22 extends perpendicularly therefrom in the opposite direction from the arm 20 so as to pass through the slot 18 and into the cavity 10 in the pedestal 8. The member 24 is provided with an opening 26 having internal threads, not shown, mating with the threads of the shaft 16 of the motor M so that the member 24 and the bracket 20, 22 are moved up or down depending on the direction of rotation of the motor M.

A holder for the shell 2 of the electrical component to be soldered is comprised of members 28 and 30 having L-shaped cross-sections, as shown in FIG. 2B, mounted to the underside of the arm 20 in such manner as to form a channel 32 having a slot 34 in its bottom. A vertical arm 36 of another L-shaped bracket passes through the opening 34 with a slide-fit and has an enlarged head 38 riding in the channel 32. The horizontal arm 40 of the bracket is provided with an opening 42 of such size and configuration that the shell 2 of the electrical component can sit therein without falling through. The arm 40 is thin enough to permit most of the mounting pins 4 and 6 and the wires 4' and 6' to extend below it.

A plate 44 that is attached to the vertical arm 22 has respective top and bottom cam lobes 46 and 48 extending in the opposite direction from the arm 20 and a vertically intermediate lobe 50 extending in the same direction as the arm 20. A normally closed microswitch LS-1 is adjustably mounted in a vertical slot 52 at such a position as to be opened when the lobe 48 strikes its arm, and a normally closed microswitch LS-2 is adjustably positioned in the slot 52 so as to be opened when the lobe 46 strikes its arm. A normally open microswitch LS-3 is mounted in any suitable manner, e.g., by a bracket 53, to the pedestal 8 in such position as to be closed when the lobe 50 strikes its arm.

A solder reservoir 54 mounted on the base 12 has a pipe 56 through which solder can be pumped to a solder pot 58. Overflow from the pot 58 falls back into the reservoir 54 so as to cause a flow of solder in the pot 58 and keep the upper surface of the solder at a given level. A reservoir 60 containing liquid solder flux at the same level as that of the solder in the pot 58 is also mounted on the base 12.

Figure 3:
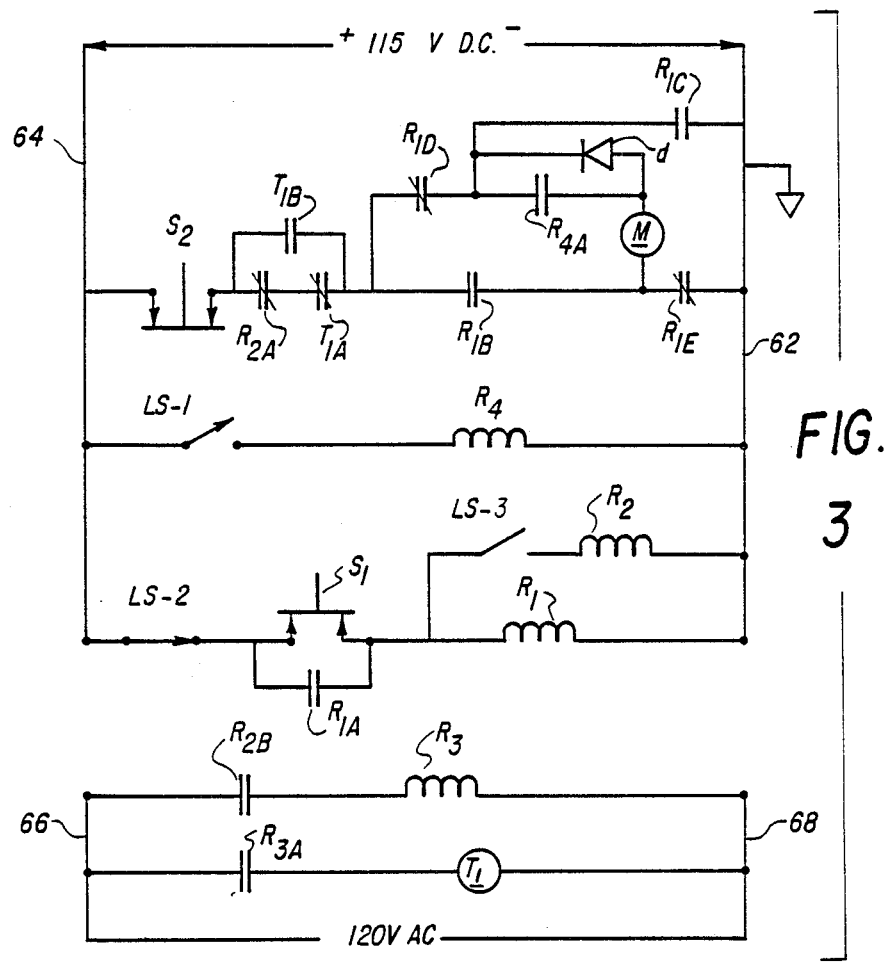
FIG. 3 is a schematic diagram of one form of control circuitry for controlling the mechanical apparatus in accordance with the invention.

Reference is now made to the schematic wiring diagram of FIG. 3 for a description of one circuit for controlling the apparatus of FIG. 2 in accordance with this invention. All relay contacts are shown in the positions they have when their respective relay coils are not energized, and the switches LS-1, LS-2 and LS-3 are shown in the positions they have when the bracket 20, 22 is in its top position, as in FIG. 1. Relay activation coils are indicated by the letter R with a numerical subscript, and the contacts controlled by a relay coil are indicated by the letter R with the same numerical subscript followed by a capital letter. Normally open contacts are indicated by spaced parallel lines, and normally closed contacts are indicated by spaced parallel lines connected by a diagonal line.

A DC voltage, herein indicated as being 115 volts, is connected between a grounded DC bus 62 and a positive bus 64, and an AC voltage is connected between AC buses 66 and 68. The normally closed switch LS-2, a start switch $S_1$ and a relay coil $R_1$ are connected in series between the buses 64, 62. Contacts $R_{1A}$ that are responsive to the coil $R_1$ are connected across $S_1$, and a series combination of the normally open switch LS-3 and a relay coil $R_2$ is connected in parallel with the relay coil $R_1$. The normally closed switch LS-1, which is held open by the lobe 48 in FIG. 2, and a relay coil $R_4$ are connected in series between the buses 64 and 62. A stop switch $S_2$ is connected in series with normally closed contacts $R_{2A}$ and timer contacts $T_{1A}$, normally open contacts $R_{1B}$ and normally closed contacts $R_{1E}$. Normally open contacts $T_{1B}$ are connected in parallel with $R_{2A}$ and $T_{1A}$. One side of the motor M is connected to the junction of $R_{1B}$ and $R_{1E}$, and its other side is connected via a diode d and contacts $T_{1C}$ to the grounded bus 62. Normally open contacts $R_{4A}$ are connected in parallel with the diode d and normally closed contacts $R_{1D}$ are connected between the junction of $T_{1A}$ and $R_{1B}$ and the junction of $R_{4A}$ and $R_{1C}$.

The AC portion of the circuit is comprised of contacts $R_{2B}$ and a relay coil $R_3$ connected in series between the AC buses 66 and 68 and another series circuit including relay contacts $R_{3A}$ and a timer $T_1$ connected between the buses 66 and 68.

The operation of the apparatus of FIG. 2 by the circuit of FIG. 3 will now be described. These figures show the condition prevailing just before the start of a dip cycle when the shell 2 is placed on the horizontal arm 40. The dip cycle is divided into three parts: the immersion of the tips of the mounting pins 4 and 6 into the solder pot 58 up to the level $L_1$ for a period determined by the timer $T_1$; the immersion of the mounting pins 4 and 6 up to the level $L_2$; and the withdrawal of the mounting pins 4 and 6 from the solder pot 58 back to their initial position. Another shell 2 is then placed on the arm 40 and the cycle is repeated.

With the contacts in the positions shown in FIG. 3, no current can flow through the motor M because of the polarity of the diode d. When the start switch $S_1$ is closed by the operator, DC current flows from the bus 64 through the switch LS-2, the switch $S_1$ and the relay coil $R_1$ to the grounded bus 62. Energization of the relay coil $R_1$ causes its contacts $R_{1A}$, $R_{1B}$, $R_{1C}$, $R_{1D}$ and $R_{1E}$ to be the opposite from that shown. Contacts $R_{1A}$ are now closed so that $S_1$ can be released. Assuming that the stop switch $S_2$ is closed, current will flow from the positive bus 64 through the stop switch $S_2$ and the normally closed contacts $R_{2A}$ and $T_{1A}$ and the now-closed contacts $R_{1B}$ to one side of the DC motor M, and from its other side via the diode d and the now-closed contacts $R_{1C}$ to the grounded bus 62. Note that the contacts $R_{1E}$ are open. This causes the motor M to turn in such direction as to lower the bracket 20, 22 and cause the mounting pins 4 and 6 to approach the solder pot 58. After a bit, the cam lobe 48 releases the arm of the switch LS-1 so that it closes and energizes the relay coil $R_4$. The relay coil $R_4$ closes its contacts $R_{4A}$ so that current for the motor M flows through the contacts $R_{4A}$ as well as across the diode d. When the mounting pins 4 and 6 are immersed in the solder to the first dip level $L_1$, which is below the level to which solder is ultimately desired, the intermediate cam lobe 50 is so positioned as to close the normally open switch LS-3 and energize the relay coil $R_2$. This opens the normally closed contacts $R_{2A}$ so as to stop the motor M, and closes the normally open contacts $R_{2B}$ so as to energize the relay coil $R_3$. The relay coil $R_3$ then closes its normally open contacts $R_{3A}$ so as to start the timer $T_1$.

During the period between the time when the mounting pins 4 and 6 reach the first dip level $L_1$ and the time when the timer $T_1$ times out, heat from the solder travels up the mounting pins 4 and 6 as well as their respective wires 4' and 6' and causes the insulation up to the second dip level $L_2$, the level to which solder is ultimately desired, to melt or loosen and flow off in the solder. In order to do this, the timer $T_1$ must be set by trial and error for the particular type of electrical component involved. When the timer $T_1$ times out, the period referred to is over and the timer $T_1$ opens its normally closed contacts $T_{1A}$ and closes its normally open contacts $T_{1B}$ so as to permit current to flow through the motor M by the same path as before and cause it to lower the bracket 20, 22 still farther.

When the mounting pins 4 and 6 are immersed in the solder up to the second dip level $L_2$, the cam lobe 46 is positioned so as to open the normally closed switch LS-2 so as to de-energize the relay coils $R_1$ and $R_2$ and cause their respective contacts $R_{1A}$, $R_{1B}$, $R_{1C}$, $R_{1D}$, $R_{1E}$ and $R_{2A}$, $R_{2B}$ to revert to the condition shown in FIG. 3. Remembering that the contacts $R_{4A}$ were previously closed when the cam surface 48 caused the switch LS-1 to close, it will be seen that current now flows through the motor M in the other direction so as to cause it to raise the bracket 20, 22 and lift the mounting pins 4 and 6 out of the solder. The current flow for this direction of rotation is from the DC bus 64 through the contacts $R_{2A}$, $T_{1A}$, $R_{1D}$ and $R_{4A}$ which is still closed to the opposite side of the motor M at which it previously entered and from the other side of the motor M to the grounded bus 62 via the contacts $R_{1E}$. When the bracket 20, 22 reaches the top of its travel, the cam lobe 48 opens the switch LS-1 so as to de-energize the relay coil $R_4$, open its contacts $R_{4A}$ and cause the motor M to stop. The apparatus is now in the condition shown and ready for another operation to be initiated by closing the start switch $S_1$.

What is claimed is:

1. A method of soldering a pin to insulated wire wrapped around it in such manner that no wire is exposed, comprising applying flux to the pin and the wire, dipping the pin into a pool of solder to a point short of the level to which solder is ultimately desired and holding it in that position until the insulation is dislodged up to the said level, and dipping the pin and wire wrapped around it farther into the pool of solder up to said level and withdrawing it from the pool before more insulation is dislodged.

2. Apparatus for forming a solder connection between the connection pins of an electrical component and insulated wires of the component that are wrapped around the pins, comprising a solder pot, means for immersing the connection pins of an electrical component, when present, into the solder in the pot to a level short of the level to which solder is ultimately desired and holding them at that level for a predetermined period, and means for immersing the connection pins farther into the solder up to the level at which solder is desired, and for removing them from the solder in a time less than said period.

* * * * *